R. B. PEARCY.
VEHICLE TONGUE.
APPLICATION FILED MAY 5, 1916.
1,197,947.
Patented Sept. 12, 1916.
2 SHEETS—SHEET 1.
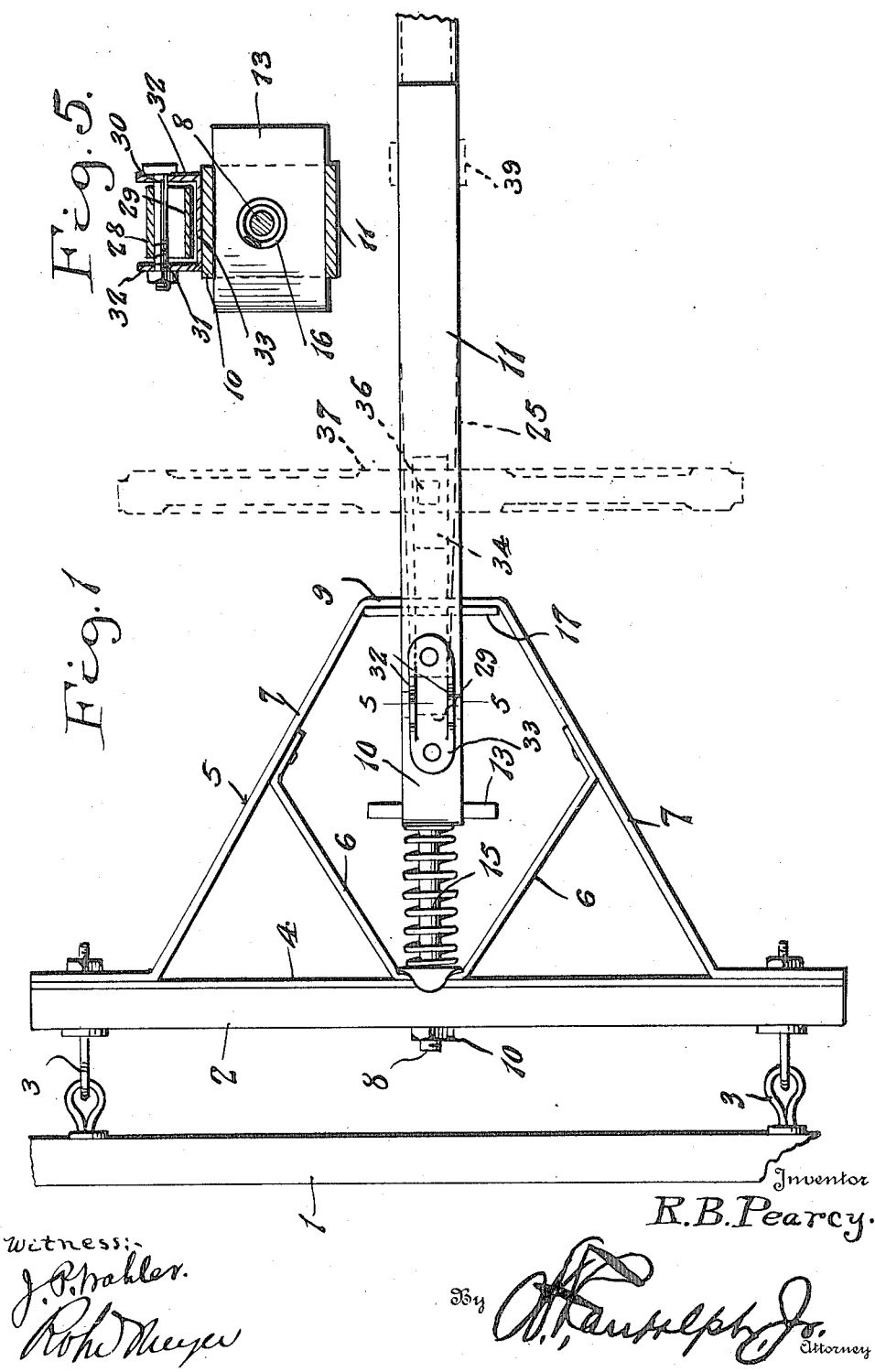
Inventor
R. B. Pearcy.
Witness:-

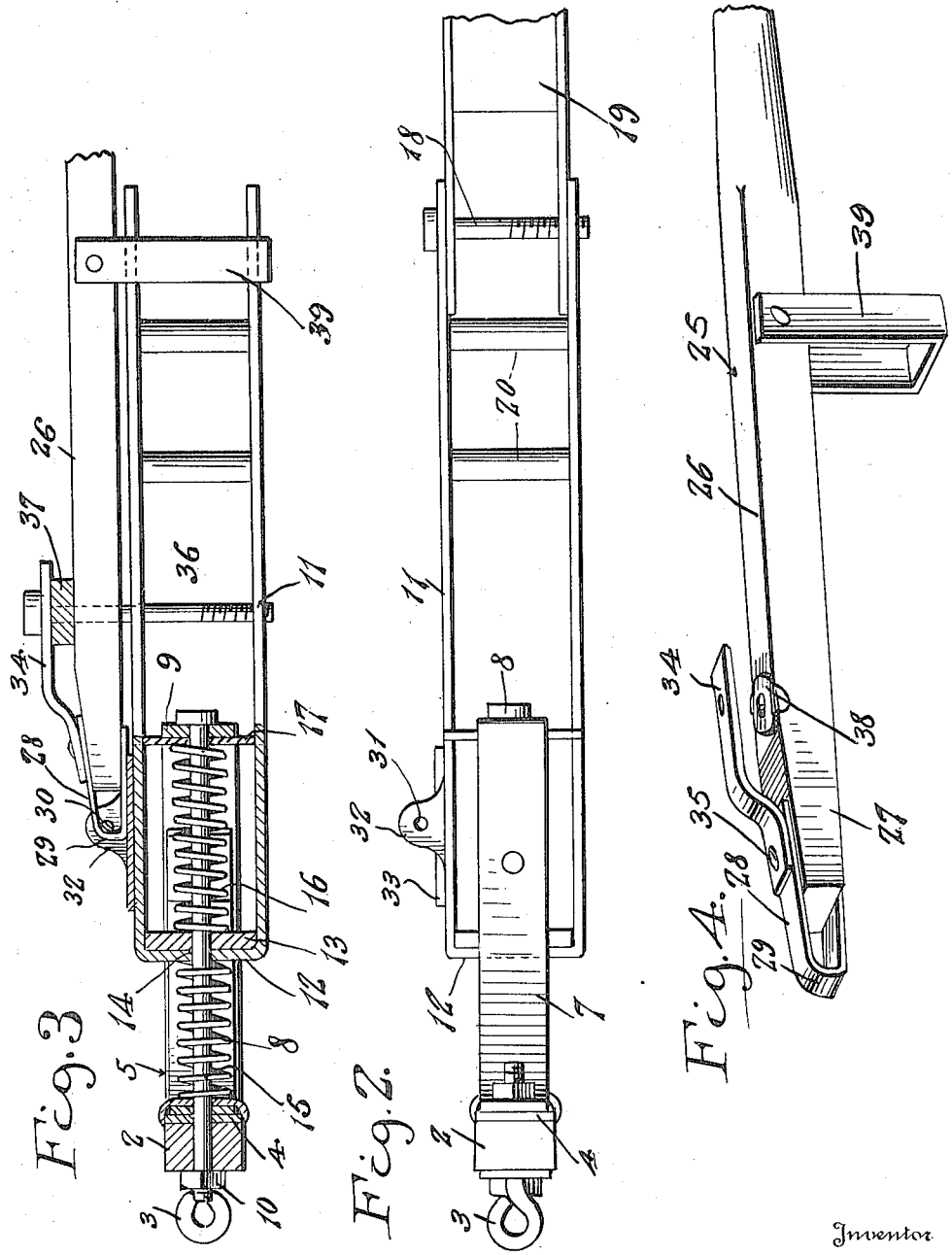

UNITED STATES PATENT OFFICE.

ROBERT B. PEARCY, OF THALIA, TEXAS.

VEHICLE-TONGUE.

1,197,947.                    Specification of Letters Patent.         Patented Sept. 12, 1916.

Application filed May 5, 1916. Serial No. 95,603.

*To all whom it may concern:*

Be it known that I, ROBERT B. PEARCY, a citizen of the United States, residing at Thalia, in the county of Foard and State of Texas, have invented certain new and useful Improvements in Vehicle-Tongues; and I do hereby declare the following to be a full, clear, and exact description of the invention, such as will enable others skilled in the art to which it appertains to make and use the same.

This invention relates to a vehicle tongue, such as is commonly employed for connecting a vehicle, such as a water wagon, wood wagon, separator or the like to a tractor for transportation.

Another object of this invention is to provide a vehicle tongue as specified, which includes a transversely extending bar which is yieldably connected to the pole or tongue proper so as to permit of a limited yieldable movement of the tongue with respect to the article being drawn thereby.

A further object of this invention is to provide an auxiliary tongue adapted for attachment to the short tongue, when it is desired to draw the vehicle to which the tongue is connected by means of draft animals.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a top plan view of the improved vehicle tongue. Fig. 2 is a side elevation of the tongue. Fig. 3 is a longitudinal section of the tongue showing the auxiliary tongue connected thereto. Fig. 4 is a detail perspective view of the auxiliary tongue, and Fig. 5 is a section on the line 5—5 of Fig. 1.

Referring more particularly to the drawings, 1 indicates the front axle of a separator, water wagon, or like vehicle which has the cross bar 2 of the tongue structure connected thereto by means of eye bolts 3. The cross bar structure 2 is reinforced by a metal plate 4 which extends over the front surface of the same.

An angle brace 5 which is substantially U-shaped in plan has the ends of its legs connected to the cross bar 2 by the eye bolts 3, and it is in turn braced by a second brace 6 which is constructed of flat metal and has its apex attached to the bar 4 and the ends of its legs attached to the sides 7 of the brace 5. A rod 8 extends through the cross piece 2, the bar 4 and the apex or bight portion 9 of the U-shaped brace 5. The rod 8 is held against movement independent of the bar 2 and the bight portion 9 by suitable nuts 10 mounted thereon.

The tongue structure proper, includes a U-shaped metallic bar 11, the end or bight portion 12 of which is reinforced by a plate 13.

The bight portion 12 and the plate 13 are provided with centrally disposed openings 14, through which the rod 8 extends. A spiral spring 15 is coiled about the rod 8 and extends between the outer surface of the bight portion 14 and the plate 4. A second spiral spring 16 is coiled in an opposite direction about the rod 8 and it extends from the forward surface of the plate 13 to the rearward or inner surface of the bight portion 9. A plate 17 is positioned about the rod 8 inwardly of the bight portion 9, and the end of the spring 16 engages the plate. The outer ends of the substantially U-shaped body 11 are connected, by means of a king bolt 18 to a relatively short ordinary tongue 19, which may be connected to a tractor or the like. Suitable brace rods 20 are positioned at various intervals along the length of the legs of the U-shaped bar or tongue body 11 for bracing the legs and holding them in their proper position. The springs 15 and 16 will permit of a limited yieldable movement of the tongue body 11 and the tongue 19, with respect to the cross bar 2 and the axle 1.

An auxiliary tongue structure 25 is provided, which is adapted for connection to the tongue body bar 11, when it is desired to pull the vehicle to which the tongue is connected, by draft animals in lieu of by a tractor. The auxiliary tongue structure 25 includes the tongue bar or pole 26, the rear end of which is slightly reduced as shown at 27. A metallic plate 28 is attached to and extends rearwardly from the reduced end 27, and it is bent to assume substantially a U-shape, having its bight portion 29 rounded as clearly shown in Figs. 3 and 4 of the drawings. For connecting the rear end of the tongue body or pole 26 to the tongue body bar 11, a pin 30 is inserted through openings 31 which are formed in upstanding ears 32. The ears 32 are formed upon a plate 33 which plate is attached to the upper surface of the upper leg of the U-shaped body 11 a short distance forwardly of the bight portion 12 of this body. A keeper bar 34 is attached as shown at 35 to the tongue body 26, and it is provided for receiving a king pin as indicated at 36, for connecting a double or draft tree indicated at 37, to the tongue body 26. A wear plate 38 is mounted upon the upper surface of the tongue or pole 26 for preventing wear occasioned by the pivotal movement of draft evener bar 37. A U-shaped strap 39 is attached to the tongue body 26, forwardly of its rear reduced end 27, which strap is provided for mounting over the forward ends of the legs of the U-shaped tongue body bar 11, when the auxiliary tongue is attached to, as clearly shown in Fig. 3 of the drawing. When the auxiliary tongue 26 is attached to the tongue body bar 11, the tongue 19 is disconnected therefrom.

In reducing the invention to practice, certain minor features of construction, combination and arrangement of parts may necessitate alteration to which the patentee is entitled provided such alterations are comprehended within the scope of what is claimed.

What is claimed is:—

1. In a tongue structure, the combination, of a cross bar adapted for connection with a vehicle axle, a substantially U-shaped bracing bar connected to and extending forwardly from said cross bar, a U-shaped tongue body bar, a pin carried by said first named U-shaped bracing bar and said cross bar, the bight portion of said U-shaped body bar being slidably mounted upon said pin, and spiral springs coiled about said pin and having their facing ends engaging the bight portion of said U-shaped body bar for yieldably supporting the U-shaped body bar, the outer end of said U-shaped body bar being adapted for pivotal connection to a tongue.

2. In a tongue structure, the combination, of a cross bar adapted for connection with a vehicle axle, a substantially U-shaped bracing bar connected to and extending forwardly from said cross bar, a U-shaped tongue body bar, a pin carried by said first named U-shaped bracing bar and said cross bar, the bight portion of said U-shaped body bar being slidably mounted upon said pin, and spiral springs coiled about said pin and having their facing ends engaging the bight portion of said U-shaped bar for yieldably supporting the U-shaped body bar, a pair of upstanding ears formed upon the upper leg of said U-shaped body bar, an auxiliary tongue comprising a pole, a metallic bar secured to the rear end of said pole and a pin pivotally connecting said metallic bar to said upstanding ears.

3. In a tongue structure, the combination, of a cross bar adapted for connection with a vehicle axle, a substantially U-shaped bracing bar connected to and extending forwardly from said cross bar, a U-shaped tongue body bar, a pin carried by said first named U-shaped bracing bar and said cross bar, the bight portion of said U-shaped body bar being slidably mounted upon said pin, and spiral springs coiled about said pin and having their facing ends engaging the bight portion of said U-shaped bar for yieldably supporting the U-shaped body bar, a pair of upstanding ears formed upon the upper leg of said U-shaped body bar, an auxiliary tongue comprising a pole, a metallic bar secured to the rear end of said pole and a pin pivotally connecting said metallic bar to said upstanding ears, a depending metallic strap secured to said pole outwardly of its rear end and adapted for mounting over the outer end of said U-shaped body bar.

In testimony whereof I affix my signature in presence of two witnesses.

ROBERT B. PEARCY.

Witnesses:
G. W. BURRESS,
E. H. ROBERTS.

Copies of this patent may be obtained for five cents each, by addressing the "Commissioner of Patents, Washington, D. C."